March 8, 1932. J. M. CANTWELL 1,848,765
JACK
Filed Feb. 28, 1927 2 Sheets-Sheet 1
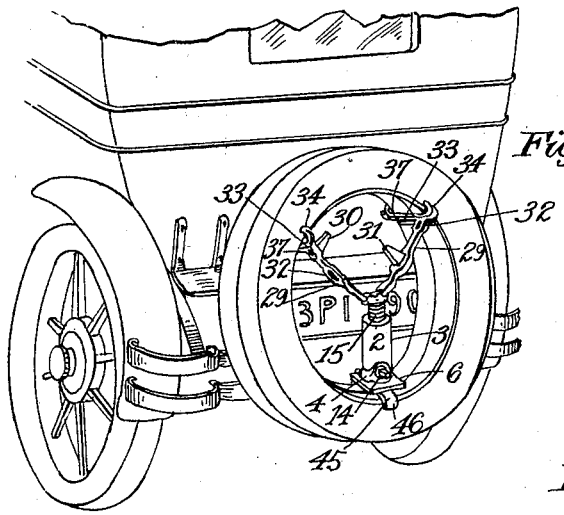
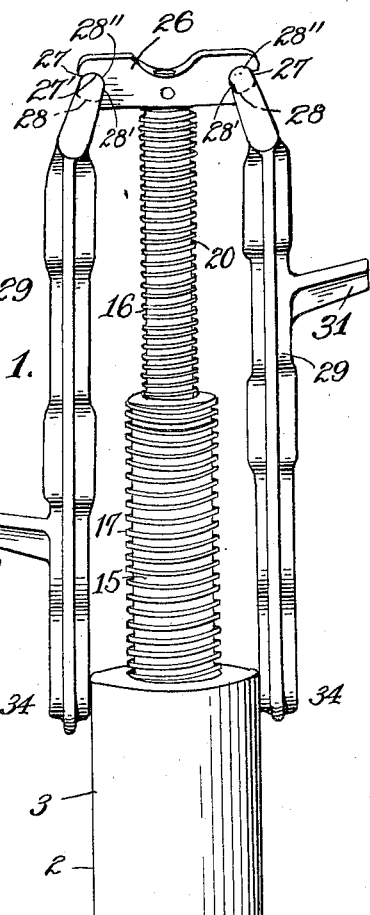
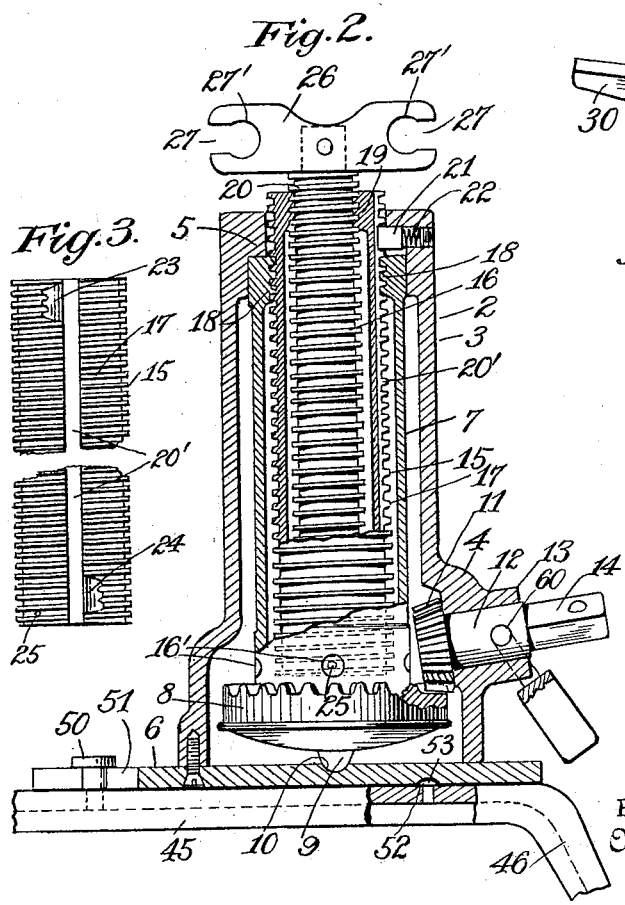
Inventor.
John M Cantwell
By his Attorney March 8, 1932.  J. M. CANTWELL  1,848,765
JACK
Filed Feb. 28, 1927    2 Sheets-Sheet 2
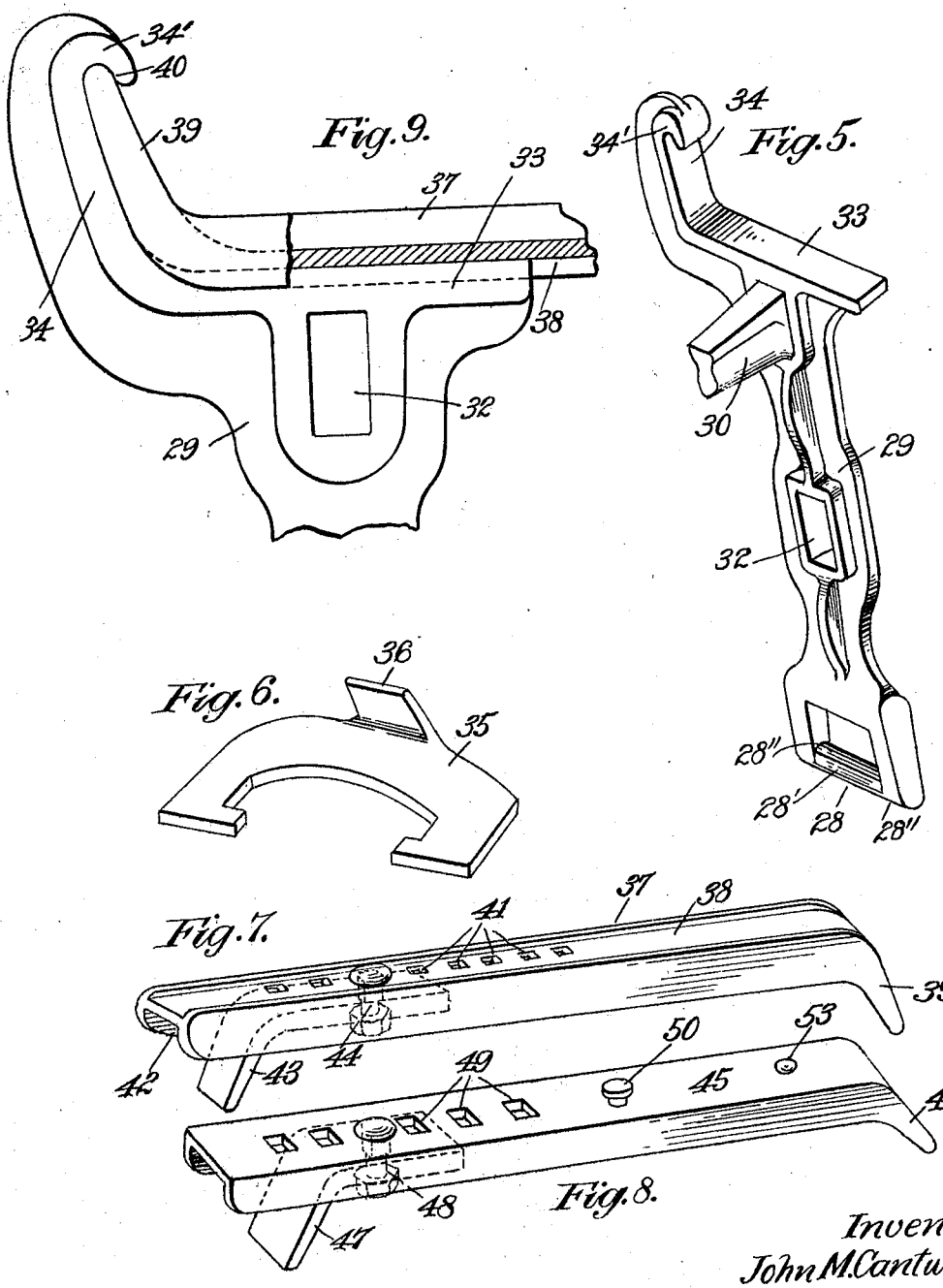
Inventor,
John M. Cantwell
By his Attorney Patented Mar. 8, 1932

1,848,765

UNITED STATES PATENT OFFICE

JOHN M. CANTWELL, OF TARRYTOWN, NEW YORK; ANNA L. CANTWELL ADMINISTRATRIX OF SAID JOHN M. CANTWELL, DECEASED

JACK

Application filed February 28, 1927. Serial No. 171,498.

This invention relates to screw lifting jacks particularly adapted for use with motor vehicles, the object of the invention being to provide an improved jack which may be readily carried at the rear of the motor vehicle and used as an extra tire carrier.

Another object of the invention is the provision of a combined jack, tire carrier, and tire tool, by means of which the jack can be used to carry an extra tire, but can also be used as a means for removing or replacing shoes on the rim.

A further object of the invention is the provision of an improved jack, simple in construction, strong, durable, powerful in use, easily operated and comparatively inexpensive to manufacture and so constructed that it may be readily used for a very low lift and yet easily adjusted for a high or an extra high lift, as may be necessary, and which can not only be used as a tire tool but also as an extra tire carrier and may therefore be carried at the rear of the car.

In the drawings accompanying and forming a part of this specification, Fig. 1 is a side view of this improved jack with both screws raised without the tire supporting iron shown in Fig. 8 applied to the base of the jack; Fig. 2 is a vertical sectional view of this improved jack with the screws in nearly closed position; Fig. 3 is a detail view of the tubular screw; Fig. 4 illustrates the jack in position on the rear of a car in position to support an extra tire; Fig. 5 is a perspective view of one of the rim tool irons; Fig. 6 is a perspective view illustrating a cooperating rim tool iron; Fig. 7 is a perspective view of one of the tire supporting irons adapted to coact with a rim tool iron when the jack is used as a tire carrier; Fig. 8 is a perspective view of a cooperating tire supporting iron adapted to be used on the base of the jack when the same is used as a tire carrier, and Fig. 9 is a view illustrating the application of the tire supporting iron shown in Fig. 7 to the rim tool iron shown in Fig. 5.

Similar characters of reference indicate corresponding parts in the several figures of the drawings.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

This improved jack in its preferred form comprises a suitable casing 2, comprising a cylindrical portion 3 having an enlarged chamber 4 at its base. The upper end of the casing is provided with an inwardly extending flange 5, and to the base is attached by means of suitable screws a bottom plate 6. Located in this casing is a rotatable tubular sleeve 7, the upper end of which is overlapped by the flange 5 while the lower end has formed thereon or cast therewith a gear 8, the underside of which is of convex formation and is provided centrally thereof with a hardened steel bearing knob or projection 9 resting in a depression 10 of the base plate, thereby forming a pivotal support for the rotation of this sleeve. In mesh with this large gear 8 is a bevel gear 11, the spindle 12 of which projects through a bored hub 13 at the side of the chamber 4, the spindle 12 being provided with a squared end 14 for the reception of a suitable handle or crank which is usually of telescopic form whereby the jack may be easily placed under the car wherever required and as easily removed without the necessity of getting under the car.

Within the rotary tubular sleeve 7 is a pair of telescoping screws 15 and 16 both of substantially the same length and both preferably right handed screws. The outer screw 15 is in the form of a tubular member having exterior threads 17 along its length meshing with a threaded portion or collar 18 located at the upper end on the interior of the tubular sleeve 7. This tubular or hollow screw 15 is also provided at its upper end with an interiorly threaded portion or collar 19 meshing with threads 20 located along the length of the inner screw 16, which is shown as a solid bar. The tubular screw 15 is provided exteriorly thereof with a longitudinal slot or keyway 20' for the reception of the end of a spring pressed tooth or plunger key 21 carried in an opening at the upper end of the casing and above the sleeve 7, the spring 22 for this key being located in an opening of the casing. These screws 15 and 16 are completely housed within the casing 3 which can be comparatively low thus enabling the jack to have a very low lift, and yet the screws can be extended to give a very high lift. The tubular screw 15 has its threads smoothed or slabbed off, see Fig. 3, at its upper and lower ends as at 23 and 24 respectively and with which slabbed portions the longitudinal slot 20' communicates, the slabbed portion at the upper end being at one side of the slot and the slabbed portion at the lower end at the opposite end of the slot. The inner screw member 16 is provided with a suitable pin, not shown, insertible through suitable openings 16' at the lower end of the tubular sleeve 7 and screw 15, for limiting the upward movement of the screw 16, this pin coming into engagement with the threaded portion 19 of the tubular screw 15 and the latter is likewise provided with a suitable pin 25 which when it comes into engagement with the interior threads 18 of the tubular sleeve 7 will limit the upward movement of the screw 15. The top of the screw 16 is reduced for the reception of a supporting member or head 26 preferably pinned thereto and this head is slotted at its ends as at 27. These slots terminate in circular recesses 27' for the reception of stirrup bars 28 of a pair of tire rim irons 29. These rim irons, by means of the slotted circular recesses can be swung up or down and can also be removed but only when in a horizontal position owing to the fact that the stirrup bars are flattened at their sides as at 28'. These flattened portions correspond in thickness substantially to the slotted portions of the recesses while at right angles to these flattened portions as at 28'' they correspond substantially to the circular portions of such recesses. These tire rim irons are provided with alternately located steps 30 and 31, one jack step carried by each iron, and the irons are also provided with alternately located openings 32, each in position for the reception of one of the jack steps. Thus each iron is provided with a jack step and an opening, one above the other and as stated, these openings are alternately located as are also the steps, so that when these rim irons are swung into a raised position from that shown in Fig. 1, the step of one iron will project into an opening of its companion iron and these recesses or steps may have a tapered form, thereby to bind or wedge the irons in upright position. In the present instance the steps are shown as of tapered form.

Due to the alternate location of the steps it will be observed that the jack can be used when the steps are in the position shown in Fig. 1 to engage the part to be lifted at different heights below the head 26 of the jack, so that in any position of the screws, raised or completely lowered, both of the steps are in position to engage under a low hung axle or frame of a vehicle, thus providing a very efficient means for getting under the axle or frame of a motor car when the wheels have sunk in the mud or sand.

Each iron is provided at its top with a suitable extension 33 which can be used when the irons are swung upward to increase the height of the jack and these extensions terminate in hooked ends 34 adapting the irons to be used as a tire tool. When it is desired to use the jack and the swinging irons as a tire tool, a bifurcated plate 35, see Fig. 6, is used. This is slipped over the base plate with the tongue or projection 36 extending downward. By swinging the irons up so as to engage the tire rim first at one side of the joint and then at the opposite sides of such joint and hooking plate 35 into the rim at the opposite side of the rim and manipulating the screws through the medium of its gears, the rim may be contracted to remove a shoe and in the last position may be expanded after the shoe is in position.

In spreading the shoe rim it is necessary merely to use the swinging rim irons 29 and not the iron 35 of Fig. 6, since the base of the jack may be used against the rim. In contracting the rim, however, the lower iron 35 is used.

The jack can also be used as a spare tire carrier and for this purpose it is particularly well adapted by the provision of channel irons such as shown in Figs. 7 and 8. Each channel iron 37, two being used, one for each rim tool, see Fig. 7, has a longitudinally recessed underside 38 and the iron is provided with an upwardly bent inner end 39 terminating in a bifurcated or slotted portion 40 adapted to fit under the hook end 34' of a rim iron. The upwardly bent end conforms in shape to the hooked end 34 of the rim iron and the recessed lower side 38 receives the extended portion 33 of the rim iron thus rigidly interlocking the tire carrier iron. The latter is provided with a series of openings 41 and in the longitudinally recessed or channeled upper side 42 of the iron is located a tire clip 43 secured to the iron by a suitable bolt and nut 44, the bolt of which may project through any one of the openings in the iron to adjust the clip and thereby the iron to different widths of rims. As the nut is on the upper side of the iron and in contact with the tire rim when the shoe and its rim are in position while the bolt head is of smooth or convex formation, it follows that removal of the bolt for the purpose of removing the tire is prevented. Cooperating with these tire supporting irons 37, one for each rim iron 29, is an iron 45, see Fig. 8, of somewhat similar formation in that it is also of longitudinally channeled form and provided with a bent end 46 and an adjustable clip 47 adjustably secured in position by a bolt and nut 48 and suitable openings 49. This iron however is provided with a headed pin 50 on its inner or upper side in position to be received in a slot 51 of the bottom plate 6 of the jack. This bottom plate also has a recess 52 for the reception of a rivet head 53 whereby the proper positioning of the lower tire iron is insured.

The manner in which the jack is used to carry the spare tire is shown in Fig. 4. The bottom iron 45 carried by the base plate 6 of the jack is so positioned that one bent end 46 of the iron 45 overlaps the rim of the shoe while the other bent portion or clip as 47 overlaps the extra shoe rim which usually comes with the car. The irons carried by the tire rim irons are also positioned in a similar manner, the clips of the irons being of course adjusted properly to permit this result. Thereupon by manipulating the jack gears the screws are somewhat extended so as to firmly position the jack in place, thereby supporting the extra shoe in position on the rear of the car. To prevent release of the jack and removal of the spare shoe, the spindle 12 of the bevel gear 11 and the hub 13 of the casing are provided with registering openings 60 through which the shank of a lock may be inserted so that when the jack and shoe are in position, the turning of the bevel pinion gear 11 is prevented and consequently the manipulation of the jack is prevented.

In the operation of this improved jack, the rotation of the small bevel pinion gear 11 rotates the large bevel gear 8 carried at the bottom of the threaded sleeve 7, which is of course held against longitudinal movement by the base plate 6 and the flange 5. The rotation of this sleeve around the tubular screw 15 forces the latter upward, the rotation of the screw 15 being prevented by the tooth 21 passing along the longitudinal slot 20' of the screw 15. This upward movement of the tubular outer screw 15 carries with it the inner solid screw 16 without however rotating or extending it. When, however, the screw 15 has reached its extended position, tooth 21 passes out of the slot 20 and registers with the lower slabbed portion 24 and thus slips out of the slot 20 of the screw 15 whereupon this screw 15 will be rotated by the tubular sleeve 7, as the tooth will simply slip over the lower threads of this screw. This rotation of the screw 15 then rotates and projects the inner screw 16 until the same has been fully extended. If the height of the jack is not then sufficient the rim irons 29 may be thrown upward and used. A reverse operation, as soon as the rotation of the screw 15 brings the slot 20 opposite the tooth 21 then lowers the screw 15 until it has been fully lowered and when the slabbed off portion 23 at the top of this screw 15 comes opposite the tooth 21 the tubular screw will then be rotated again by the sleeve 7 thereby to return the inner screw 16 in a manner which will be readily understood.

From the foregoing it will be observed that if each screw is about eight inches in height a jack is provided having a total lift of about 15 inches since the screws necessarily overlap a small amount, without the use of the rim irons 29 while with the use of the rim irons the height of the jack is materially increased practically another 15 inches, this depending upon the length of the rim irons. Thus, I have provided a jack which is useful for many purposes, and particularly useful for motor vehicles where the under frame or axles are low hung or close to the ground. Furthermore, it will be observed that both screws are of the same length and yet are no greater in length than the casing. It will also be observed that the large bevel gear 8 is formed as a part of the sleeve 7 forming the base thereof, so that this sleeve and bevel gear can be in one casting with the sleeve resting at its center directly on the plate 6 by means of the hardened steel rivet or knob 9 without the necessity of providing any ball races since the frictional resistance is very slight. Furthermore, as the threads 18 are formed as a part of the sleeve 7 and as the threads 19 are formed as a part of the tubular screw 15, this eliminates the necessity of providing separate pinned collars likely to be displaced and by slabbing off the threads of the screws in the manner described the necessity of specially machining annular grooves is avoided while the provision of a spring pressed tooth which can be easily removed and replaced when worn is permitted.

Thus it will be observed that when the screws are telescoped the jack may have a height of about 7½ or 8 inches and if the tire rim irons are in position and swing downward both of the steps will be below the top of the casing, so that either can be used even though the axle or under frame of the car is within a few inches of the ground or road bed. When the jack screws are fully extended the jack will have a total height of about three times the height of the casing and if this is not sufficient or if for any reason a greater height is desired the tire rim irons 29 may be swung upward thereby increasing the height to practically double the height of the lifting screws. In this instance the car body can be raised to release the pressure on the springs thereby enabling the leaves of the springs to be lubricated. It will also be observed that by the use of the rim tire irons in the manner hereinbefore described, the tires may be readily removed and replaced. It will also be observed that by the provision of the tire irons shown in Figs. 7 and 8, the jack is readily used as an extra tire carrier and when properly positioned neither the shoe nor the jack can be removed, and that the irons have the clips thereof adjustable to fit any size of tire rim while the nuts are inaccessible when the shoe is in position so that it cannot be tampered with.

Thus I have provided an improved jack simple in construction and inexpensive to manufacture and one which is easily operated, the same being an improvement in part over the jack shown in my Patent No. 1,540,511, dated June 2, 1925, and my contemporaneously pending application Serial No. 116,780, filed June 18, 1926.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A jack comprising a base, lifting means and means for operating said lifting means, a pair of swinging members carried by the lifting means, and means carried by the base and swinging members for supporting a motor vehicle shoe rim, said last means also having means for positioning the jack on a vehicle.

2. A jack comprising a base, lifting means and means for operating said lifting means, a pair of swinging members carried by the lifting means, means carried by the base and swinging members for supporting a motor vehicle shoe rim, and means for locking said lifting means in its shoe supporting position.

3. A jack comprising a base, a pair of lifting means, and means for operating them, one of said lifting means having a head, a pair of swinging rim irons carried by said head, and detachable tire supporting irons interlocked with said rim irons and base for supporting a shoe rim.

4. A jack comprising a base, a pair of lifting means, and means for operating them, one of said lifting means having a head, a pair of swinging rim irons carried by said head, detachable tire supporting irons interlocked with said rim irons and base for supporting a shoe rim, and means for locking said lifting means in their shoe supporting position.

5. A jack comprising a casing, a pair of lifting means carried therein and means for operating said means, a pair of swinging rim irons carried by one of said lifting means, and means carried by said rim irons and base for supporting a shoe rim, said last means also having means for positioning the jack on a vehicle.

6. A jack comprising a casing, a pair of lifting means carried therein and means for operating said means, a pair of swinging rim irons carried by one of said lifting means, and means carried by said rim irons and base for supporting a shoe rim, said rim supporting means having means adjustable to various widths of rims.

7. A jack comprising a casing, a pair of lifting means carried therein and means for operating said means, a pair of swinging rim irons carried by one of said lifting means, means carried by said rim irons and base of supporting a shoe rim, and means for locking said lifting means.

8. A shoe rim supporting iron for use with a jack and comprising a lengthwise channel shaped member having a bent end and an adjustable clip secured adjacent to its opposite end, said iron having means for interlocking it with the base or a tire removing iron of the jack.

9. A rim iron for use with a jack and having a hooked end, a stirrup end, and therebetween a step and an opening.

10. A pair of rim irons for use with a jack each having a hooked end, a stirrup end and intermediate thereof a step and an opening, the steps and openings of said irons being alternately located.

11. The combination of a rim iron and a tire supporting iron for use with a jack, said rim iron having a hooked shaped end and said tire iron having a channeled portion and a slotted end for receiving portions of the rim iron.

12. The combination of a rim iron and a tire supporting iron for use with a jack, said rim iron having a hooked shaped end and said tire iron having a channel portion and a slotted end for receiving portions of the rim iron, said tire iron having an adjustable clip.

13. A combined rim iron and tire supporting iron for use with a jack, one having a channeled portion for the reception of the other and one having a hook and the other a recessed end for interlocking engagement.

14. A rim removing iron and tire supporting iron for use with a jack, said irons having unthreaded interlocking portions.

15. A rim iron and tire supporting iron for use with a jack, said irons having unthreaded interlocking portions and said tire iron having an adjustable clip.

16. A rim iron and tire supporting iron for use with a jack, said irons having interlocking portions, said tire iron having an adjustable clip and said rim iron having a projecting step.

17. A rim iron and tire supporting iron for use with a jack, said irons having interlocking portions, said tire iron having an adjustable clip and said rim iron having a projecting step, an opening and a stirrup formed end.

18. A jack having a base, lifting means, and means for operating said lifting means, and tire removing means comprising a member cooperating with the base, and a pair of members cooperating with the lifting means and having alternately located permanently fixed steps.

19. A jack comprising a base, lifting means, and means for operating said lifting means, tire removing means cooperating with the base and with the lifting means, and tire rim supporting means cooperating with the tire removing means carried by the lifting means, said supporting means also having means for attaching the jack to a vehicle.

20. A jack comprising a base, lifting means, and means for operating said lifting means, tire removing means cooperating with the base and with the lifting means, and tire rim supporting means cooperating with the tire removing means carried by the lifting means, said tire removing means having alternately located steps.

21. In a screw lifting jack, the combination of supporting means, a pair of telescopic lifting screws, means for lifting one of said screws without rotating it and for then rotating it thereby to lift the other screw, said means including a rotatable sleeve and gear mechanism connected with said sleeve for rotating it, one of said screws having a slot and alternately extending slabbed portions at opposite ends of said slot, and means cooperating with said slot and slabbed portions.

22. In a lifting jack, the combination of a pair of telescopic outer and inner screws, a threaded sleeve embracing said outer screw for operating the same, a supporting casing housing said sleeve and having a projecting key located above said sleeve, said outer screw having a vertical keyway for receiving said key and slabbed portions at its ends, one extending in a direction opposite to that of the other, and gearing for rotating said sleeve and thereby shifting the screws.

23. A jack having a base plate and lifting means, said plate having a slot and a shoe rim supporting iron having means for engaging the rim of a shoe and a pin adapted to project into said slot.

24. A jack having a base plate and lifting means, said plate having a slot and a shoe rim supporting iron having adjustable means for engaging the rim of a shoe and a pin adapted to project into said slot.

Signed at Sea Cliff, N. Y., this 24 day of February, 1927.

JOHN M. CANTWELL.